US012712439B2

(12) United States Patent
Takahara et al.

(10) Patent No.: US 12,712,439 B2
(45) Date of Patent: Aug. 18, 2026

(54) POWER CONVERTER, MOTOR DRIVER, AND REFRIGERATION CYCLE APPLIED EQUIPMENT

(71) Applicant: Mitsubishi Electric Corporation, Tokyo (JP)

(72) Inventors: Takaaki Takahara, Tokyo (JP); Koichi Arisawa, Tokyo (JP); Haruka Matsuo, Tokyo (JP); Tomohiro Kutsuki, Tokyo (JP); Yusuke Morimoto, Tokyo (JP); Yuya Kondo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 213 days.

(21) Appl. No.: 18/705,853

(22) PCT Filed: Nov. 25, 2021

(86) PCT No.: PCT/JP2021/043271

§ 371 (c)(1),
(2) Date: Apr. 29, 2024

(87) PCT Pub. No.: WO2023/095264

PCT Pub. Date: Jun. 1, 2023

(65) Prior Publication Data

US 2025/0007388 A1 Jan. 2, 2025

(51) Int. Cl.
*H02M 7/48* (2007.01)
*F24F 11/88* (2018.01)
(Continued)

(52) U.S. Cl.
CPC ............ *H02M 1/143* (2013.01); *F24F 11/88* (2018.01); *H02M 7/05* (2021.05); *H02M 7/48* (2013.01)

(58) Field of Classification Search
CPC .......... H02M 1/143; H02M 1/01; H02M 7/48; H02M 7/05; H02M 1/14
See application file for complete search history.

(56) References Cited

U.S. PATENT DOCUMENTS 6,313,602 B1 * 11/2001 Arefeen ........... H02M 7/53875 363/45
7,650,760 B2 1/2010 Nakata et al.
(Continued)

FOREIGN PATENT DOCUMENTS

EP 2667502 A1 11/2013
EP 3537583 A1 9/2019
(Continued)

OTHER PUBLICATIONS

Office Action mailed on Jun. 23, 2025 issued in corresponding Chinese Patent Application No. 202080106399.5 (and English machine translation).

(Continued)

*Primary Examiner* — Sisay G Tiku
(74) *Attorney, Agent, or Firm* — Posz Law Group, PLC

(57) ABSTRACT

A power converter installed in a refrigeration cycle applied equipment includes a rectifier configured to rectify a first alternating-current power supplied from a commercial power supply, a capacitor connected to output ends of the rectifier, an inverter configured to convert power output from the rectifier and the capacitor into a second alternating-current power and to output the second alternating-current power to a motor, and a controller configured to control an operation of the inverter such that the second alternating-current power containing pulsation according to pulsation of power flowing into the capacitor from the rectifier is output from the inverter and to reduce current flowing to the capacitor. The power converter is configured to operate such that the pulsation width of the pulsating current generated by (Continued)

the second alternating-current power is different depending on whether an operation of the refrigeration cycle applied equipment is a cooling operation or a heating operation.

10 Claims, 5 Drawing Sheets

(51) Int. Cl.
*H02M 1/14* (2006.01)
*H02M 7/04* (2006.01)

(56) References Cited

U.S. PATENT DOCUMENTS

2004/0124807 A1 7/2004 Nakata et al.
2013/0300327 A1 11/2013 Sekimoto et al.
2015/0365040 A1* 12/2015 Saha ........................ H02P 27/06 318/400.25
2016/0380575 A1* 12/2016 Tsumura ................... H02P 6/14 318/478
2019/0280606 A1 9/2019 Ono et al.
2020/0036316 A1 1/2020 Yasumoto et al.
2020/0212818 A1 7/2020 Kataoka et al.
2020/0220481 A1* 7/2020 Hayashi .............. H02M 5/4585
2023/0336090 A1 10/2023 Takahara et al.
2024/0063708 A1 2/2024 Arisawa et al.
2024/0128912 A1 4/2024 Arisawa et al.
2025/0219564 A1* 7/2025 Norimatsu .............. H02P 21/22

FOREIGN PATENT DOCUMENTS

JP H07-71805 A 3/1995
JP 2001-37281 A 2/2001
JP 2004-343993 A 12/2004
JP 2005-20986 A 1/2005
JP 2006007236 A * 1/2006
JP 2018-57207 A 4/2018
JP 2018-88741 A 6/2018
JP 2019-161757 A 9/2019
WO 2019/082316 A1 5/2019

OTHER PUBLICATIONS

International Search Report of the International Searching Authority mailed Feb. 8, 2022 in corresponding International Application No. PCT/JP2021/043271 (and English translation).
International Search Report of the International Searching Authority mailed Dec. 1, 2020 in related International Application No. PCT/JP2020/040131 (and English translation).
Extended European Search Report dated Nov. 6, 2023 issued in related European Patent Application No. 20959702.0.
Office Action dated Nov. 14, 2023 issued in related Indian Patent Application No. 202327013852.
Office Action dated Dec. 11, 2023 issued in related Australian Patent Application No. 2020475165.
International Search Report of the International Searching Authority mailed Apr. 20, 2021 in related International Application No. PCT/JP2021/005359 (and English translation).
International Search Report of the International Searching Authority mailed Apr. 13, 2021 in related International Application No. PCT/JP2021/005358 (and English translation).
Hearing Notice mailed on Feb. 26, 2026 for the corresponding Indian Patent Application No. 202327013852.

* cited by examiner 2
1
POWER CONVERTER
CONTROLLER
Vs
110
501
120
131
132
133
134
130
502
504
I1
I2
I3
200
210
400
310
311a
311b
311c
311d
311e
311f
312a
312b
312c
312d
312e
312f
313a
313b
314
315

FIG.2

I1
t
I2
t
I3
t
Vdc
t

FIG.3

I1
t
I2
t
I3
t
Vdc
t

POWER CONVERTER, MOTOR DRIVER, AND REFRIGERATION CYCLE APPLIED EQUIPMENT

CROSS-REFERENCE TO RELATED APPLICATION

This application is a U.S. national stage application of PCT/JP2021/043271 filed on Nov. 25, 2021, the contents of which are incorporated herein by reference.

FIELD

The present disclosure relates to a power converter that converts an alternating-current power into desired power, a motor driver, and a refrigeration cycle applied equipment.

BACKGROUND

Conventionally, there is a power converter that converts an alternating-current power supplied from an alternating-current power supply into a desired alternating-current power and supplies the alternating-current power to a load such as an air conditioner. For example, Patent Literature 1 discloses a technology in which a power converter that is a control device of an air conditioner rectifies an alternating-current power supplied from an alternating-current power supply with a diode stack that is a rectifier, converts power smoothed by a smoothing capacitor into a desired alternating-current power with an inverter including a plurality of switching elements, and outputs the alternating-current power to a compressor motor that is a load.

CITATION LIST

Patent Literature

Patent Literature 1: Japanese Patent Application Laid-open No. 07-71805

SUMMARY OF INVENTION

Problem to be Solved by the Invention

However, according to the above conventional technology, since a large current flows into the smoothing capacitor, there has been a problem in that aged deterioration of the smoothing capacitor is accelerated. In view of such a problem, a method for suppressing a ripple change of a capacitor voltage by increasing a capacity of the smoothing capacitor or using the smoothing capacitor with a large degradation tolerance due to the ripple can be considered. However, cost of a capacitor component increases, and in addition, a size of the device increases.

The present disclosure has been made in view of the above, and an object is to obtain a power converter that can suppress an increase in size of a device while suppressing deterioration of a smoothing capacitor.

Means to Solve the Problem

To solve the above problems and to achieve the object, a power converter according to the present disclosure is a power converter to be installed in a refrigeration cycle applied equipment and includes: a rectifier; a capacitor connected to output ends of the rectifier; an inverter connected across the capacitor; and a controller. The rectifier is configured to rectify a first alternating-current power supplied from an alternating-current power supply. The inverter is configured: to convert power output from the rectifier and the capacitor into a second alternating-current power; and to output the second alternating-current power to a load including a motor. The controller is configured to control an operation of the inverter such that the second alternating-current power containing pulsation according to pulsation of power flowing from the rectifier into the capacitor is output from the inverter to the load and suppresses the current flowing to the capacitor. The power converter is configured to operate so that a pulsation width of a pulsating current generated by the second alternating-current power is different, depending on whether or not an operation of the refrigeration cycle applied equipment is a cooling operation or a heating operation, in a state where a predetermined power is received from the alternating-current power supply.

Effects of the Invention

A power converter according to the present disclosure achieves an effect of suppressing an increase in a size of a device while suppressing deterioration in a smoothing capacitor.

BRIEF DESCRIPTION OF DRAWINGS

FIG. 2 is a diagram illustrating an example of each current and a capacitor voltage of a capacitor of a smoother in a case where a current output from a rectifier is smoothed by the smoother and current flowing to an inverter is made constant.

FIG. 3 is a diagram illustrating an example of each current and a capacitor voltage of the capacitor of the smoother when a controller of the power converter according to the first embodiment controls an operation of the inverter and reduces current flowing to the smoother.

DESCRIPTION OF EMBODIMENTS

Hereinafter, a power converter, a motor driver, and a refrigeration cycle applied equipment according to embodiments of the present disclosure will be described in detail with reference to the drawings.

First Embodiment

Figure 1:
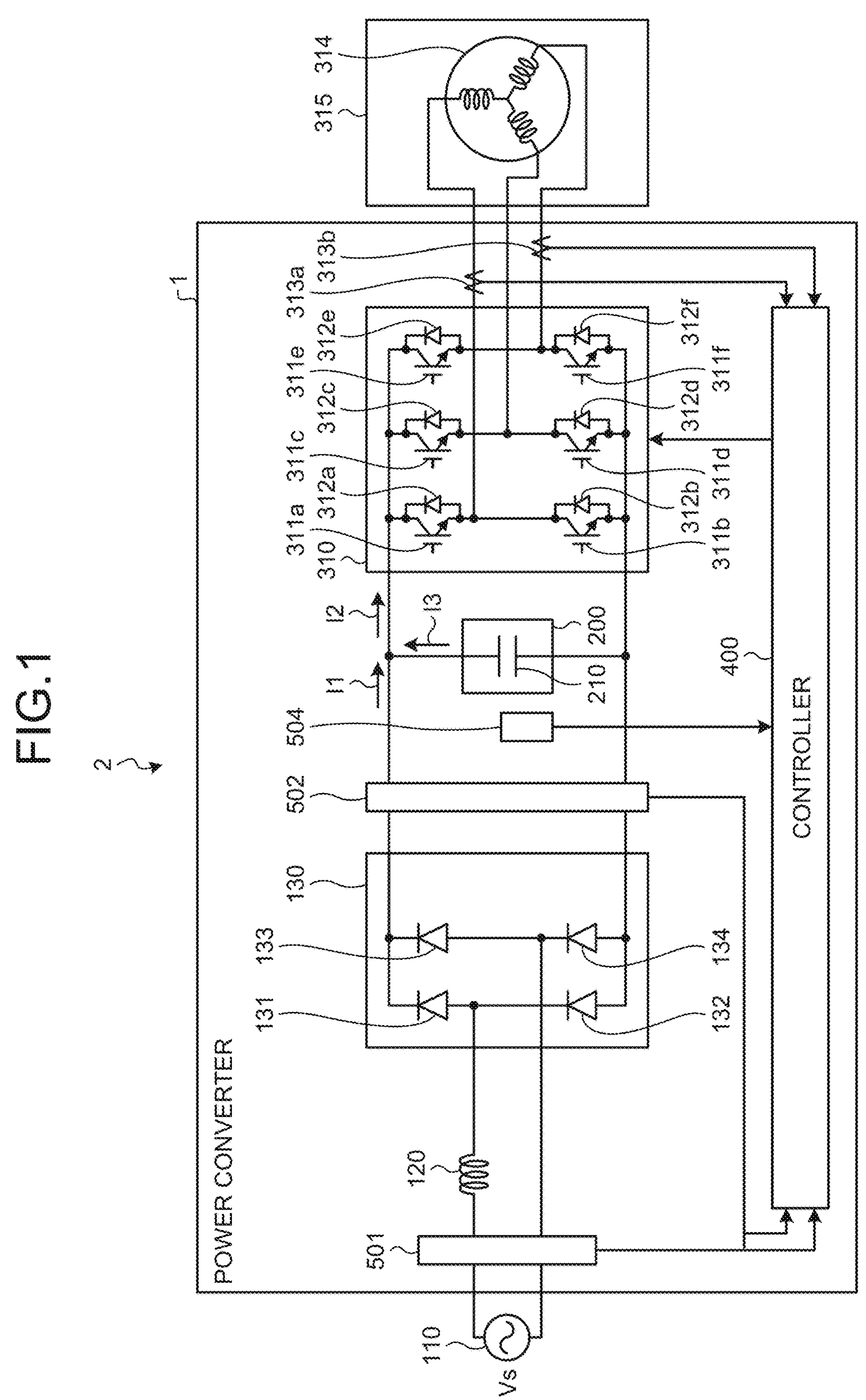
FIG. 1 is a diagram illustrating a configuration example of a power converter according to a first embodiment.

FIG. 1 is a diagram illustrating a configuration example of a power converter 1 according to a first embodiment. The power converter 1 is connected to a commercial power supply 110 and a compressor 315. The commercial power supply 110 is an example of an alternating-current power supply. The power converter 1 converts a first alternating-current power of a power supply voltage Vs supplied from the commercial power supply 110 into a second alternating-current power having a desired amplitude and phase and supplies the second alternating-current power to the compressor 315. The power converter 1 includes: a voltage-current detector 501; a reactor 120; a rectifier 130; a voltage detector 502; a smoother 200; an inverter 310; current detectors 313*a* and 313*b*; a temperature detector 504; and a controller 400. Note that a motor driver 2 is constituted by: the power converter 1; and a motor 314 included in the compressor 315. Furthermore, the power converter 1 is configured to be installed in a refrigeration cycle applied equipment to be described later.

The voltage-current detector 501 detects a voltage value and a current value of the first alternating-current power of the power supply voltage Vs supplied from the commercial power supply 110 and outputs the detected voltage value and current value to the controller 400. The reactor 120 is connected between the voltage-current detector 501 and the rectifier 130.

The rectifier 130: includes a bridge circuit including rectifier elements 131 to 134; and rectifies and outputs the first alternating-current power of the power supply voltage Vs supplied from the commercial power supply 110. The rectifier 130 performs full-wave rectification.

The voltage detector 502 detects a voltage value of power rectified by the rectifier 130 and outputs the detected voltage value to the controller 400.

The smoother 200 is connected to output ends of the rectifier 130 via the voltage detector 502. The smoother 200 includes a capacitor 210 as a smoothing element and smooths the power rectified by the rectifier 130.

The capacitor 210 is, for example, an electrolytic capacitor, a film capacitor, or the like. The capacitor 210 has a capacity for smoothing the power rectified by the rectifier 130. A voltage generated in the capacitor 210 by smoothing does not have a full-wave rectification waveform shape of the commercial power supply 110 and has a waveform shape in which a voltage ripple according to a frequency of the commercial power supply 110 is superimposed on a DC component and does not largely pulsate. The frequency of the voltage ripple is a twice component of a frequency of the power supply voltage Vs in a case where the commercial power supply 110 has a single phase, and has a 6-fold component as a main component in a case where the commercial power supply 110 has three phases. In a case where the power input from the commercial power supply 110 and power output from the inverter 310 do not change, an amplitude of the voltage ripple is determined on the basis of the capacity of the capacitor 210. The amplitude of the voltage ripple pulsates, for example, within a range in which a maximum value of the voltage ripple generated in the capacitor 210 is less than a twice of a minimum value.

The inverter 310 is connected across the smoother 200, that is, the capacitor 210. The inverter 310 includes switching elements 311*a* to 311*f* and freewheeling diodes 312*a* to 312*f*. The inverter 310 turns on/off the switching elements 311*a* to 311*f* by controlling the controller 400, converts the power output from the rectifier 130 and the smoother 200 into the second alternating-current power having a desired amplitude and phase, and outputs the second alternating-current power to the compressor 315.

Each of the current detectors 313*a* and 313*b*: detects a current value of one phase of three-phase currents output from the inverter 310; and outputs the detected current value to the controller 400. Note that, by acquiring the current values of two phases of the three-phase current values output from the inverter 310, the controller 400 can calculate a current value of one remaining phase output from the inverter 310.

The temperature detector 504 detects a temperature of the capacitor 210 and an ambient temperature of the capacitor 210 and outputs the detected temperature value to the controller 400. Note that, in a case of a general power converter, a temperature detector is provided on a control board or a circuit board. Therefore, a detection value of the temperature detector provided on the board may be substituted, without providing the temperature detector 504.

The compressor 315 is a load having the motor 314 for driving the compressor. The motor 314 rotates according to the amplitude and the phase of the second alternating-current power supplied from the inverter 310 and performs a compression operation. For example, in a case where the compressor 315 is a sealed compressor used for an air conditioner or the like, a load torque of the compressor 315 can be often regarded as a constant torque load.

Note that, in the power converter 1, arrangement of each component illustrated in FIG. 1 is an example, and the arrangement of each component is not limited to the example illustrated in FIG. 1. For example, the reactor 120 may be disposed at a subsequent stage of the rectifier 130. In the following description, the voltage-current detector 501, the voltage detector 502, and the current detectors 313*a* and 313*b* may be collectively referred to as a detector. Furthermore, the voltage value and the current value detected by the voltage-current detector 501, the voltage value detected by the voltage detector 502, and the current values detected by the current detectors 313*a* and 313*b* may be referred to as a detection value.

The controller 400 acquires the voltage value and the current value of the first alternating-current power from the voltage-current detector 501 and acquires the voltage value of the power rectified by the rectifier 130 from the voltage detector 502. Furthermore, the controller 400 acquires a current value of the second alternating-current power having the desired amplitude and phase converted by the inverter 310 from the current detectors 313*a* and 313*b* and acquires the temperature or the temperature value of the ambient temperature of the capacitor 210 from the temperature detector 504. The controller 400 controls an operation of the inverter 310, specifically, on/off of the switching elements 311*a* to 311*f* included in the inverter 310, using the detection value detected by each detector. Note that the controller 400 does not need to use all the detection values acquired from each detector and can perform control using some detection values.

In the first embodiment, the controller 400 controls current flowing into the capacitor 210 of the smoother 200, by a pulsating current generated by the second alternating-current power. Specifically, the controller 400 controls the operation of the inverter 310 such that the second alternating-current power containing pulsation according to pulsation of the power flowing into the capacitor 210 of the smoother 200 from the rectifier 130 is output from the inverter 310 to the compressor 315 that is a load. Here, the pulsation according to the pulsation of the power flowing into the capacitor 210 of the smoother 200 is pulsation that varies, for example, depending on a frequency of the pulsation of the power flowing into the capacitor 210 of the smoother 200 or the like. As a result, the controller 400 controls the current flowing to the capacitor 210 of the smoother 200.

Next, an operation of the controller 400 included in the power converter 1 will be described. Note that, in the power converter 1 according to the first embodiment, the loads generated by the inverter 310 and the compressor 315 can be regarded as a constant load. Therefore, here, the following description is made as assuming that a constant current load is connected to the smoother 200 in a case of viewing current output from the smoother 200, in the power converter 1.

Here, as illustrated in FIG. 1, current flowing from the rectifier 130 is referred to as current I1, current flowing into the inverter 310 is referred to as current I2, and current flowing from the smoother 200 is referred to as current I3. The current I2 is current obtained by combining the currents I1 and I3. The current I3 can be expressed as a difference between the currents I2 and I1, that is, current obtained by the current I2—the current I1. In the current I3, a discharging direction of the smoother 200 is set as a positive direction, and a charging direction of the smoother 200 is set as a negative direction. That is, the current may flow into and from the smoother 200.

Figure 2:
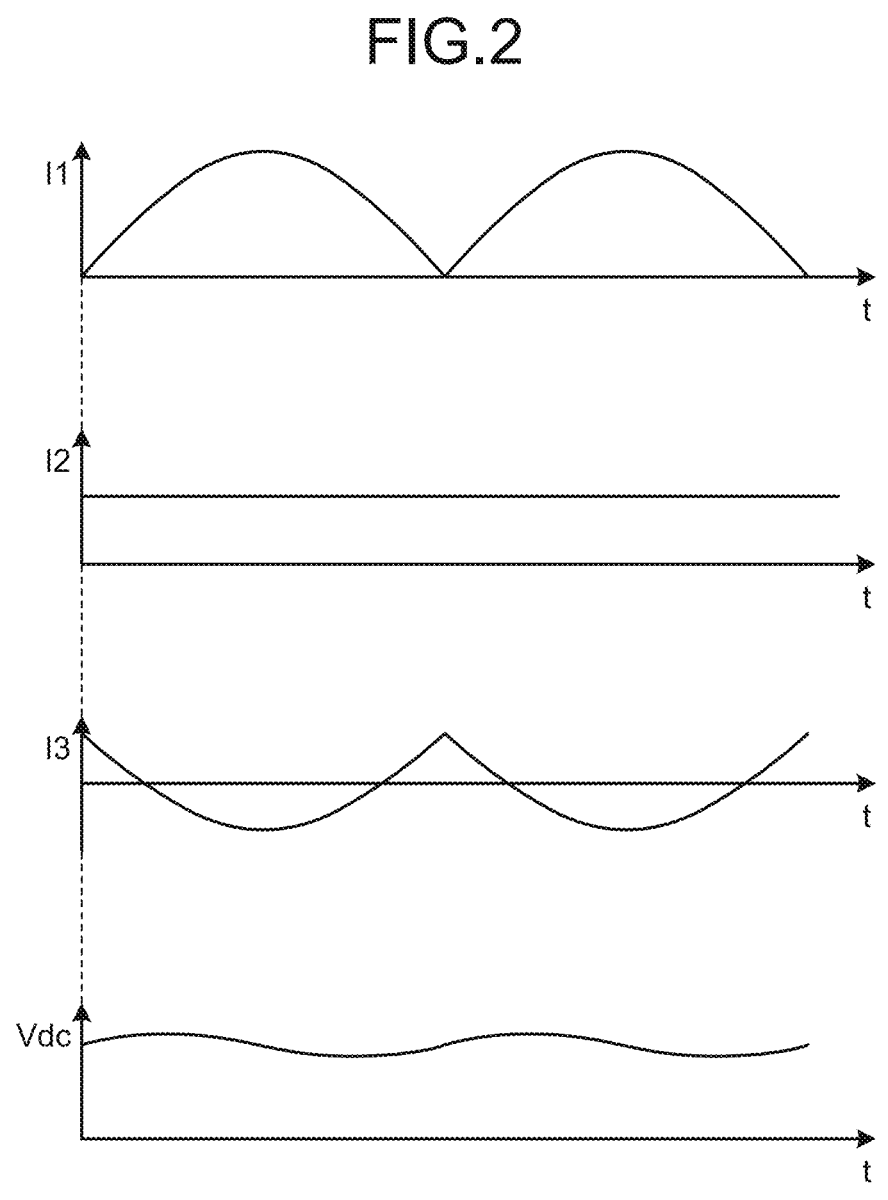

FIG. 2 is a diagram illustrating an example of each of the currents I1 to I3 and a capacitor voltage Vdc of the capacitor 210 of the smoother 200 in a case where the current output from the rectifier 130 is smoothed by the smoother 200 and the current I2 flowing to the inverter 310 is made constant. From the top, the current I1, the current I2, the current I3, and the capacitor voltage Vdc of the capacitor 210 generated according to the current I3 are illustrated. A vertical axis of the currents I1 to I3 indicates a current value, and a vertical axis of the capacitor voltage Vdc indicates a voltage value. All the horizontal axes indicate a time t. Note that, although carrier components of the inverter 310 are actually superimposed on the currents I2 and I3, the carrier components are omitted here. The same applies to the following.

As illustrated in FIG. 2, in the power converter 1, if the current I1 flowing from the rectifier 130 is sufficiently smoothed by the smoother 200, the current I2 flowing to the inverter 310 has a constant current value. However, the large current I3 flows into the capacitor 210 of the smoother 200, and this causes deterioration in the capacitor 210. Therefore, in the first embodiment, in the power converter 1, the controller 400 controls the current I2 flowing to the inverter 310, that is, the operation of the inverter 310, so as to reduce the current I3 flowing to the smoother 200.

Figure 3:
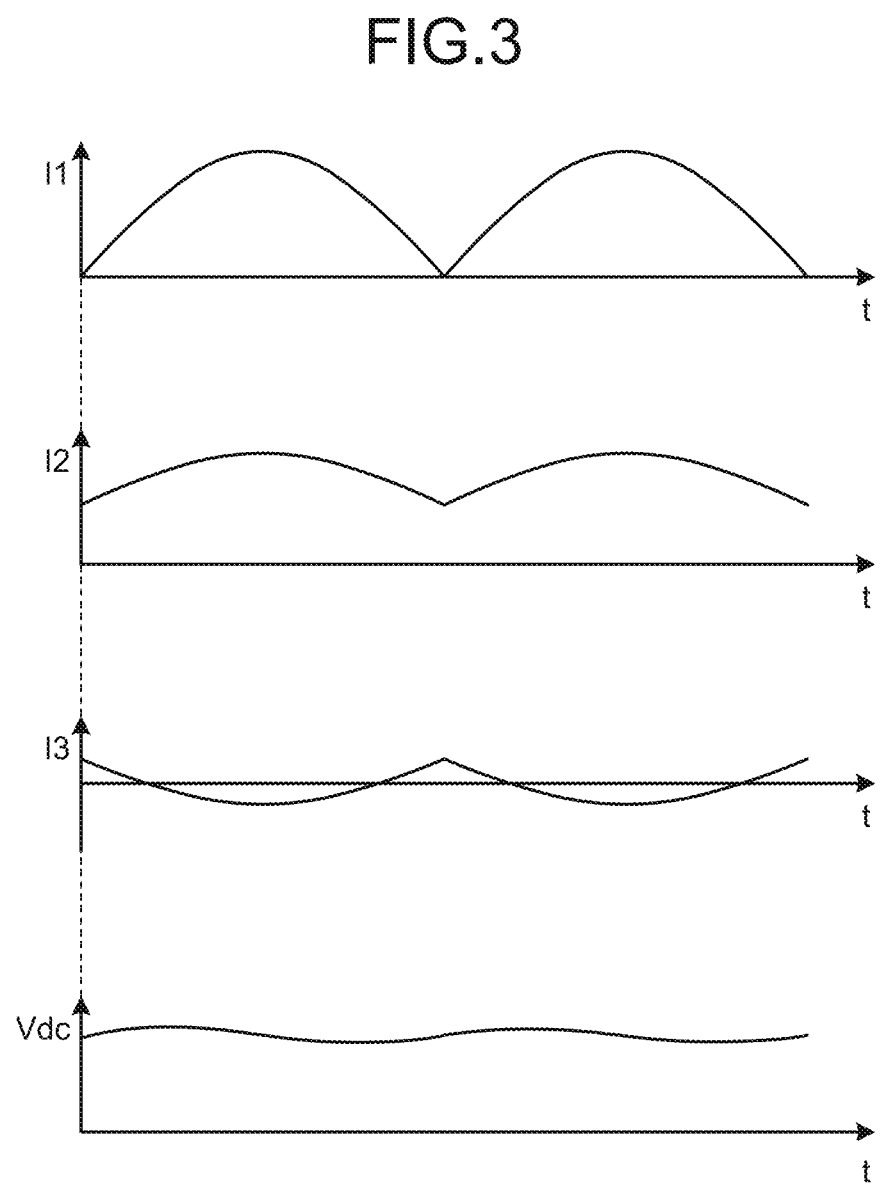

FIG. 3 is a diagram illustrating an example of each of the currents I1 to I3 and the capacitor voltage Vdc of the capacitor 210 of the smoother 200 when the controller 400 of the power converter 1 according to the first embodiment controls the operation of the inverter 310 and reduces the current I3 flowing to the smoother 200. From the top, the current I1, the current I2, the current I3, and the capacitor voltage Vdc of the capacitor 210 generated according to the current I3 are illustrated. A vertical axis of the currents I1 to I3 indicates a current value, and a vertical axis of the capacitor voltage Vdc indicates a voltage value. All the horizontal axes indicate a time t. The controller 400 of the power converter 1 controls the operation of the inverter 310 such that the current I2 as illustrated in FIG. 3 flows to the inverter 310. With this control, as compared with the example in FIG. 2, the current flowing from the rectifier 130 into the smoother 200 is reduced, and as a result, the current I3 flowing to the smoother 200 is reduced. Specifically, the controller 400 controls the operation of the inverter 310 such that the current I2 including the pulsating current having the frequency component of the current I1 as a main component flows to the inverter 310.

The frequency component of the current I1 is determined by a frequency of an alternating-current supplied from the commercial power supply 110 and a configuration of the rectifier 130. Therefore, the controller 400 can set the frequency component of the pulsating current superimposed on the current I2 as a component having a predetermined amplitude and phase. The frequency component of the pulsating current superimposed on the current I2 has a waveform similar to the frequency component of the current I1. The controller 400 can reduce the current I3 flowing to the smoother 200 and reduce a pulsating voltage generated in the capacitor voltage Vdc as the frequency component of the pulsating current superimposed on the current I2 approaches the frequency component of the current I1.

Controlling the pulsation of the current flowing to the inverter 310 by controlling the operation of the inverter 310 by the controller 400 is equivalent to controlling the pulsating current generated by the second alternating-current power output from the inverter 310 to the compressor 315. The controller 400 controls the operation of the inverter 310 so that a pulsation amount, that is, a pulsation width of the pulsating current generated by the second alternating-current power output from the inverter 310 becomes smaller than that of the pulsating current generated by the power output from the rectifier 130.

The controller 400 controls the pulsation width of the pulsating current generated by the second alternating-current power output from the inverter 310, so that the pulsation of the current flowing into and from the capacitor 210 becomes smaller than the pulsation of the current generated in the capacitor 210 when the pulsation according to the pulsation of the power flowing to the capacitor 210 is not included in the second alternating-current power output from the inverter 310. Alternatively, the controller 400 controls the pulsation width of the pulsating current generated by the second alternating-current power output from the inverter 310 so that pulsation of the voltage of the capacitor voltage Vdc, that is, the pulsation of the voltage generated in the capacitor 210 becomes smaller than the pulsation of the voltage generated in the capacitor 210 when pulsation power according to the pulsation of the power flowing into the capacitor 210 is not included in the second alternating-current power output from the inverter 310. Note that, when the pulsation according to the pulsation of the power flowing into the capacitor 210 is not included in the second alternating-current power output from the inverter 310 means the control illustrated in FIG. 2. Furthermore, the pulsation width is a difference between a maximum value and a minimum value of the pulsating current.

The control described above is referred to as "power supply pulsation compensation control". That is, the power supply pulsation compensation control is control for suppressing a ripple current that may flow to the capacitor 210 of the smoother 200 due to power supply pulsation. According to the power supply pulsation compensation control, most of the ripple current due to the power supply pulsation is supplied to the load avoiding the capacitor 210. Therefore, by using the power supply pulsation compensation control, it is possible to reduce stress of the capacitor 210 and suppress the deterioration of the capacitor 210.

Note that the alternating-current supplied from the commercial power supply 110 is not particularly limited and may have a single phase or three phases. It is sufficient for the controller 400 to determine the frequency component of the pulsating current superimposed on the current I2, according to the first alternating-current power supplied from the commercial power supply 110. Specifically, the controller 400 controls the pulsation waveform of the current I2 flowing to the inverter 310: to a frequency component that is twice of the frequency of the first alternating-current power in a case where the first alternating-current power supplied from the commercial power supply 110 has a single phase; or to a shape obtained adding the direct current to the pulsation waveform having a frequency component that is six times of the frequency of the first alternating-current power as a main component in a case where the first alternating-current power supplied from the commercial power supply 110 has three phases. The pulsation waveform is, for example, a shape of an absolute value of a sine wave or a shape of a sine wave. In this case, the controller 400 may add at least one frequency component among integral-multiple components of a frequency of the sine wave to the pulsation waveform, as a predefined amplitude. Furthermore, the pulsation waveform may be a shape of a rectangular wave or a shape of a triangular shape. In this case, the controller 400 may set the amplitude and the phase of the pulsation waveform to be predetermined values.

The controller 400 may: calculate the pulsation amount of the pulsating current generated by the second alternating-current power output from the inverter 310, using the voltage applied to the capacitor 210 or the current flowing to the capacitor 210; or may calculate the pulsation amount of the pulsating current generated by the second alternating-current power output from the inverter 310, using a voltage or current of the first alternating-current power supplied from the commercial power supply 110.

Figure 4:
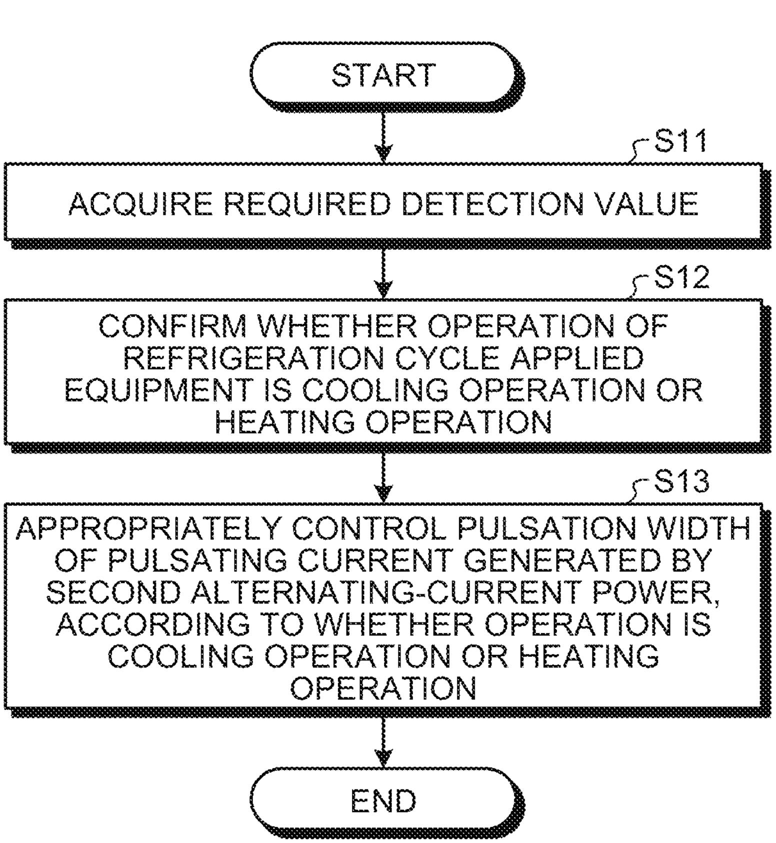
FIG. 4 is a flowchart illustrating an operation of the controller included in the power converter according to the first embodiment.

Next, an operation of the controller 400 in a case where the power converter 1 is installed in the refrigeration cycle applied equipment will be described with reference to the flowchart. FIG. 4 is a flowchart illustrating the operation of the controller 400 included in the power converter 1 according to the first embodiment.

The controller 400 acquires a required detection value from each detector of the power converter 1 (step S11). The controller 400 confirms whether an operation of the refrigeration cycle applied equipment is a cooling operation or a heating operation (step S12). The controller 400 appropriately controls the pulsation width of the pulsating current generated by the second alternating-current power, according to whether the operation is the cooling operation or the heating operation (step S13).

Note that the flowchart in FIG. 4 includes various operation modes. First, a first operation mode in the first embodiment will be described. The first operation mode is an operation mode in which the pulsation width of the pulsating current generated by the second alternating-current power is different, depending on whether or not the operation of the refrigeration cycle applied equipment is the cooling operation or the heating operation, in a state where predetermined power is received from the commercial power supply 110. Note that, here, to operate a heat pump device of the refrigeration cycle applied equipment in a cooling cycle is referred to as the “cooling operation”, and to operate the heat pump device of the refrigeration cycle applied equipment in a heating cycle is referred to as the “heating operation”.

For example, it is considered to control the operation of the inverter 310 so that the pulsation width of the pulsating current generated by the second alternating-current power output from the inverter 310 to the motor 314 at the time of cooling operation becomes larger than that at the time of heating operation. In general, at the time of the cooling operation, the ambient temperature of the refrigeration cycle applied equipment is higher, and life degradation of the capacitor 210 is accelerated. Therefore, if control is performed so that the pulsation width of the pulsating current at the time of cooling operation becomes larger than that at the time of heating operation, conversely, control is performed so that the pulsation width of the pulsating current at the time of heating operation becomes smaller than that at the time of cooling operation, it is possible to make the power supply pulsation compensation control strongly work at the time of cooling operation when an outside temperature is high. As a result, under a cooling condition in which a temperature environment is severe, it is possible to effectively reduce a capacitor current, and it is possible to suppress self-heating of the capacitor 210. As a result, the capacitor 210 with a low heat-resistant temperature can be applied.

For example, it is considered to control the operation of the inverter 310 so that the pulsation width of the pulsating current generated by the second alternating-current power output from the inverter 310 to the motor 314 at the time of heating operation becomes larger than that at the time of cooling operation. In a case where the refrigeration cycle applied equipment is an air conditioner, in a cold district, there is a possibility that the air conditioner operates the heating operation at an extremely low temperature. The extremely low temperature is, for example, equal to or lower than −20° C. It is generally known that a capacitance of the capacitor is lowered as the temperature is lowered. When the capacitance of the capacitor 210 is significantly lowered, it is difficult to stably operate an air conditioning operation. Therefore, control is performed so that the pulsation width of the pulsating current at the time of heating operation becomes larger than that at the time of cooling operation. With this control, at the time of heating operation with a low outside temperature, it is possible to heat the capacitor 210. As a result, even in a case where the refrigeration cycle applied equipment is placed in an extremely low temperature environment, the refrigeration cycle applied equipment can be stably operated.

According to the first operation mode described above, since an operation condition according to an operation request of the refrigeration cycle applied equipment can be set, an appropriate protection operation of the capacitor 210 can be realized. Note that, according to the first operation mode, there is a case where the pulsation width of the pulsating current generated by the second alternating-current power becomes zero during at least one of the cooling operation and the heating operation in a state where predetermined power is received from the commercial power supply 110. Furthermore, according to the first operation mode, in a state where the predetermined power is received from the commercial power supply 110, there is a case where the pulsation width of the pulsating current generated by the second alternating-current power during both of the cooling operation and the heating operation is not zero. It is considered that control according to the first operation mode may be useful or not useful, depending on functions of a product, a use place of the product, or a cost effectiveness. Therefore, it is desirable to determine whether or not to adopt the control according to the first operation mode, in consideration of the functions of the product, the use place of the product, or the cost effectiveness.

Next, a second operation mode in the first embodiment will be described. The second operation mode is an operation mode in which the pulsation width of the pulsating current generated by the second alternating-current power is increased or the phase of the pulsating current is changed to heat the capacitor 210 when the temperature or the ambient temperature of the capacitor 210 is equal to or less than a threshold in a case where the operation of the refrigeration cycle applied equipment is the heating operation. For example, in a case where the refrigeration cycle applied equipment is the air conditioner, there is a problem in that, if the power supply pulsation compensation control is performed by the control similar to that of the cooling operation performed when the outside temperature is high at the time when the outside temperature is low and when the outside temperature is high, the heating of the capacitor 210 is not sufficiently accelerated at the time of heating operation performed when the outside temperature is low. Therefore, when the temperature of the capacitor 210 or the ambient temperature of the capacitor 210 is equal to or lower than the threshold, the pulsation width of the pulsating current generated by the second alternating-current power is increased or the phase of the pulsating current is changed to actively heat the capacitor 210. This control accelerates the heat generation of the capacitor 210. As a result, even in a case where the refrigeration cycle applied equipment is placed in an extremely low temperature environment, the refrigeration cycle applied equipment can be stably operated.

Note that the phase of the pulsating current in a case where the phase of the pulsating current is changed to heat the capacitor 210 can be an opposite phase of the phase of the pulsating current in a case where the pulsation of the current flowing to the capacitor 210 is suppressed. The opposite phase is to reverse the phase of the pulsating current by 180°. By using such a method, the power supply pulsation compensation control with respect to the capacitor 210 and the heat control of the capacitor 210 can be easily and quickly switched.

Next, a third operation mode in the first embodiment will be described. The third operation mode is an operation mode in which the pulsation width of the pulsating current generated by the second alternating-current power is reduced so as to alleviate the heat generation of the capacitor 210 when the temperature or the ambient temperature of the capacitor 210 is equal to or higher than a first threshold; and the pulsation width of the pulsating current generated by the second alternating-current power is increased so as to accelerate the heat generation of the capacitor 210 when the temperature or the ambient temperature of the capacitor 210 is equal to or lower than a second threshold smaller than the first threshold. Furthermore, similarly to the second operation mode, the phase of the pulsating current may be changed, instead of decreasing or increasing the pulsation width of the pulsating current generated by the second alternating-current power. Note that, when the temperature or the ambient temperature of the capacitor 210 is higher than the second threshold and lower than the first threshold, normal power supply pulsation compensation control is performed.

According to the third operation mode, it is possible to control the temperature of the capacitor 210 according to a temperature condition. As a result, since it is possible to reduce the stress of the capacitor 210 and prevent the deterioration of the capacitor 210, the refrigeration cycle applied equipment can be stably operated.

Note that, similarly to the control according to the first operation mode, it is considered that the control according to the second and third operation modes may be useful or not useful, depending on the functions of the product, the use place of the product, or the cost effectiveness. Therefore, it is desirable to determine whether or not to adopt the control according to the second and third operation modes, in consideration of the functions of the product, the use place of the product, or the cost effectiveness.

Figure 5:
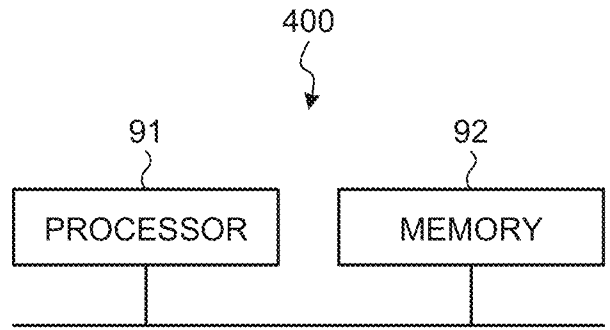
FIG. 5 is a diagram illustrating an example of a hardware configuration that implements the controller included in the power converter according to the first embodiment.

Next, a hardware configuration of the controller 400 included in the power converter 1 will be described. FIG. 5 is a diagram illustrating an example of a hardware configuration that implements the controller 400 included in the power converter 1 according to the first embodiment. The controller 400 is implemented by a processor 91 and a memory 92.

The processor 91 is, for example, a central processing unit (CPU) (also referred to as central processing unit, processing device, arithmetic device, microprocessor, microcomputer, processor, and digital signal processor (DSP)) or a system large scale integration (LSI). As the memory 92, a nonvolatile or volatile semiconductor memory can be exemplified such as a random access memory (RAM), a read only memory (ROM), a flash memory, an erasable programmable read only memory (EPROM), or an electrically erasable programmable read only memory (EEPROM) (registered trademark). Furthermore, the memory 92 is not limited to these and may be a magnetic disk, an optical disk, a compact disk, a mini disk, or a digital versatile disc (DVD).

As described above, the power converter 1 according to the first embodiment controls the operation of the inverter 310 so that the second alternating-current power containing the pulsation according to the pulsation of the power flowing from the rectifier 130 into the capacitor 210 is output from the inverter 310 to the motor 314 and performs control for suppressing the current flowing to the capacitor 210. With this control, it is possible to reduce the stress of the capacitor 210 and suppress the deterioration of the capacitor 210. As a result, since it is possible to reduce the capacity of the capacitor 210 and use the capacitor 210 with a small degradation tolerance due to a ripple, it is possible to suppress an increase in a size of the power converter 1.

The power converter 1 operates so that the pulsation width of the pulsating current generated by the second alternating-current power is different, depending on whether or not the operation of the refrigeration cycle applied equipment is the cooling operation or the heating operation, in a state where predetermined power is received from the commercial power supply 110. According to the refrigeration cycle applied equipment in which the power converter 1 that operates in this way is installed, it is possible to perform the cooling operation, the heating operation, and an operation suitable for a temperature environmental condition. As a result, the refrigeration cycle applied equipment can be stably operated.

Second Embodiment

Figure 6:
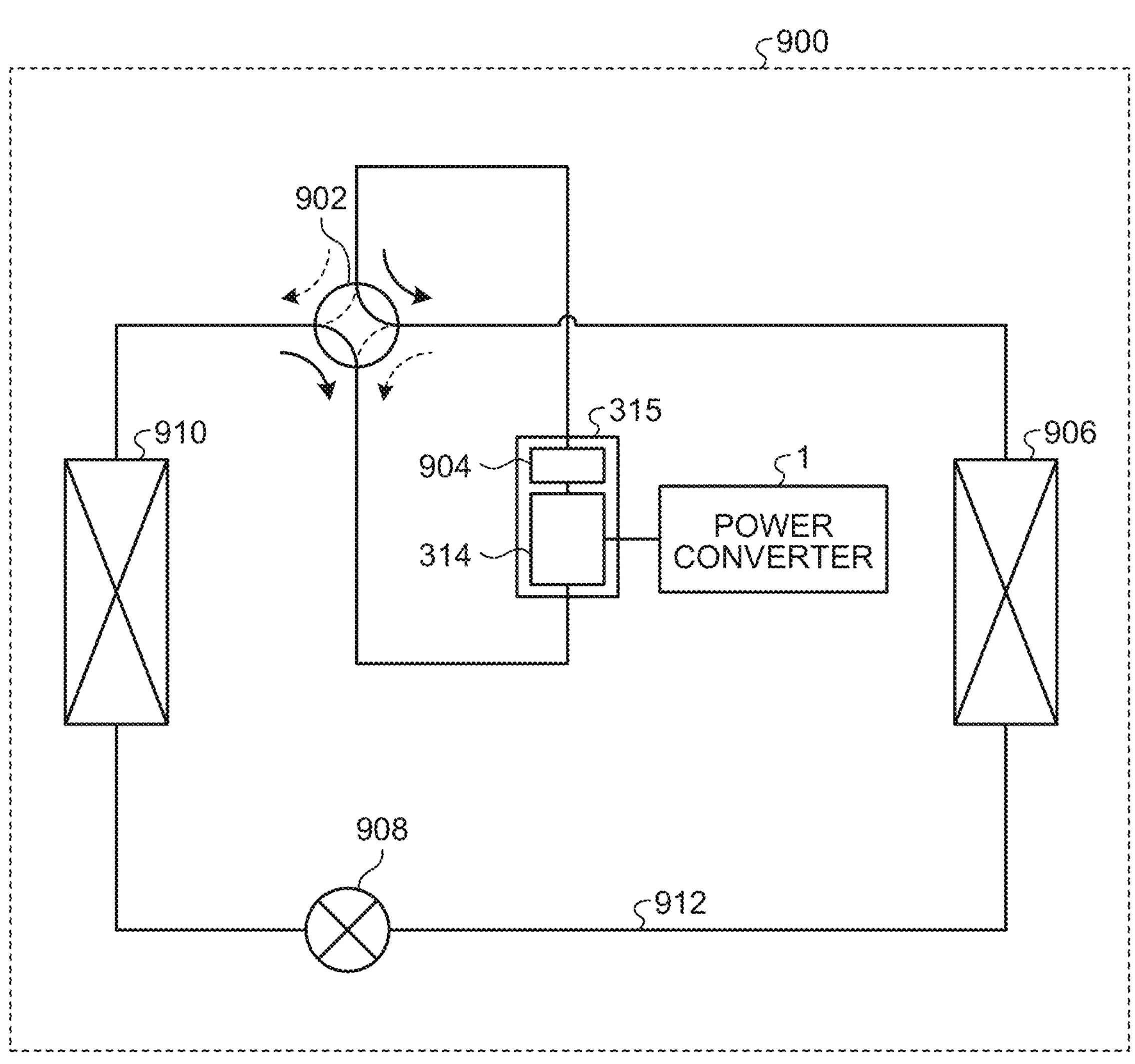
FIG. 6 is a diagram illustrating a configuration example of a refrigeration cycle applied equipment according to a second embodiment.

In a second embodiment, a refrigeration cycle applied equipment in which the power converter 1 according to the first embodiment is installed will be described. FIG. 6 is a diagram illustrating a configuration example of a refrigeration cycle applied equipment 900 according to the second embodiment. The refrigeration cycle applied equipment 900 according to the second embodiment includes the power converter 1 described in the first embodiment. The refrigeration cycle applied equipment 900 according to the second embodiment can be applied to a product including a refrigeration cycle such as an air conditioner, a refrigerator, a freezer, or a heat pump water heater. Note that, in FIG. 6, components having functions similar to those of the first embodiment are denoted with the same reference numerals as in the first embodiment.

In the refrigeration cycle applied equipment 900, the compressor 315 including the motor 314 in the first embodiment, a four-way valve 902, an indoor heat exchanger 906, an expansion valve 908, and an outdoor heat exchanger 910 are attached via a refrigerant pipe 912.

In the compressor 315, a compression mechanism 904 that compresses a refrigerant and the motor 314 that operates the compression mechanism 904 are provided.

The refrigeration cycle applied equipment 900 can perform a heating operation or a cooling operation by a switching operation of the four-way valve 902. The compression mechanism 904 is driven by the motor 314 that is variable speed controlled.

At the time of heating operation, as indicated by a solid arrow, the refrigerant is pressurized and sent by the compression mechanism 904, passes through the four-way valve 902, the indoor heat exchanger 906, the expansion valve 908, the outdoor heat exchanger 910, and the four-way valve 902, and returns to the compression mechanism 904.

At the time of cooling operation, as indicated by a broken arrow, the refrigerant is pressurized and sent by the compression mechanism 904, passes through the four-way valve 902, the outdoor heat exchanger 910, the expansion valve 908, the indoor heat exchanger 906, and the four-way valve 902, and returns to the compression mechanism 904.

At the time of heating operation, the indoor heat exchanger 906 releases heat by acting as a condenser, and the outdoor heat exchanger 910 absorbs heat by acting as an evaporator. At the time of cooling operation, the outdoor heat exchanger 910 releases heat by acting as a condenser, and the indoor heat exchanger 906 absorbs heat by acting as an evaporator. The expansion valve 908 decompresses and expands the refrigerant.

Note that the configurations illustrated in the above embodiments indicate an example and can be combined with another known technique. Furthermore, the configurations illustrated in the embodiments can be partially omitted or changed without departing from the scope. Furthermore the operation described in the above embodiments indicates an example, and the first to the third operation modes can be combined, and the first to the third operation modes can be combined with another known technique without departing from the scope.

REFERENCE SIGNS LIST

1 power converter; 2 motor driver; 91 processor; 92 memory; 110 commercial power supply; 120 reactor; 130 rectifier; 131 to 134 rectifier element; 200 smoother; 210 capacitor; 310 inverter; 311*a* to 311*f* switching element; 312*a* to 312*f* freewheeling diode; 313*a*, 313*b* current detector; 314 motor; 315 compressor; 400 controller; 501 voltage-current detector; 502 voltage detector; 504 temperature detector; 900 refrigeration cycle applied equipment; 902 four-way valve; 904 compression mechanism; 906 indoor heat exchanger; 908 expansion valve; 910 outdoor heat exchanger; 912 refrigerant pipe.

The invention claimed is:

1. A power converter to be installed in a refrigeration cycle applied equipment, the power converter comprising:

a rectifier configured to rectify a first alternating-current power supplied from an alternating-current power supply;

a capacitor connected to output ends of the rectifier;

an inverter connected across the capacitor, configured:

to convert power output from the rectifier and the capacitor into a second alternating-current power; and to output the second alternating-current power to a load comprising a motor; and a controller configured:

to control an operation of the inverter such that the second alternating-current power containing pulsation according to pulsation of power flowing into the capacitor from the rectifier is output from the inverter to the load; and to suppress current flowing to the capacitor, wherein in a state where predetermined power is received from the alternating-current power supply, a pulsation width of a pulsating current generated by the second alternating-current power is different depending on whether an operation of the refrigeration cycle applied equipment is a cooling operation or a heating operation.

2. The power converter according to claim 1, wherein the controller is configured to control the operation of the inverter such that the pulsation width of the pulsating current generated by the second alternating-current power output from the inverter at a time of the heating operation becomes smaller than that at a time of the cooling operation.

3. The power converter according to claim 1, wherein the controller is configured to control the operation of the inverter such that the pulsation width of the pulsating current generated by the second alternating-current power output from the inverter at a time of heating operation becomes larger than that at a time of the cooling operation.

4. The power converter according to claim 3, wherein in a case where the operation of the refrigeration cycle applied equipment is the heating operation, the controller is configured to heat the capacitor when a temperature of the capacitor or an ambient temperature of the capacitor is equal to or lower than a threshold:

by increasing the pulsation width of the pulsating current generated by the second alternating-current power; or by changing a phase of the pulsating current.

5. The power converter according to claim 4, wherein the phase of the pulsating current in a case where the phase of the pulsating current is changed to heat the capacitor is an opposite phase of the phase of the pulsating current in a case where the pulsation of the current flowing to the capacitor is suppressed.

6. The power converter according to claim 3, wherein when a temperature of the capacitor or an ambient temperature of the capacitor is equal to or higher than a first threshold, the controller is configured:

to reduce the pulsation width of the pulsating current generated by the second alternating-current power so as to alleviate heat generation of the capacitor; or to change a phase of the pulsating current, and when the temperature of the capacitor or the ambient temperature of the capacitor is equal to or lower than a second threshold that is smaller than the first threshold, the controller is configured:

to increase the pulsation width of the pulsating current generated by the second alternating-current power so as to accelerate the heat generation of the capacitor; or to change the phase of the pulsating current.

7. The power converter according to claim 1, wherein at least one of a time of the cooling operation and a time of the heating operation in the state where predetermined power is received from the alternating-current power supply, the pulsation width of the pulsating current generated by the second alternating-current power is zero.

8. The power converter according to claim 1, wherein in the state where predetermined power is received from the alternating-current power supply, the pulsation width of the pulsating current generated by the second alternating-current power at a time of both of the cooling operation and the heating operation is not zero.

9. A motor driver comprising:
the power converter according to claim 1.

10. A refrigeration cycle applied equipment comprising:
the power converter according to claim 1.

* * * * *